United States Patent [19]

Domnick

[11] Patent Number: 4,578,961

[45] Date of Patent: Apr. 1, 1986

[54] ABSORPTION APPARATUS FOR USE WITH ABSORPTION HEAT PUMPS

[75] Inventor: Ronald Domnick, Hamburg, Fed. Rep. of Germany

[73] Assignee: Shell Oil Company, Houston, Tex.

[21] Appl. No.: 699,985

[22] Filed: Feb. 11, 1985

[30] Foreign Application Priority Data

Feb. 11, 1984 [DE] Fed. Rep. of Germany ... 8404100[U]

[51] Int. Cl.$^4$ ............................................. F25B 37/00
[52] U.S. Cl. ....................................... 62/494; 62/476; 261/140 A; 261/147; 261/153
[58] Field of Search ................. 62/476, 484, 485, 494, 62/324.2; 261/104 A, 148, 147, 153

[56] References Cited

U.S. PATENT DOCUMENTS

| | | | |
|---|---|---|---|
| 1,993,518 | 3/1935 | Maiuri | 62/494 |
| 2,352,814 | 7/1944 | Thomas | 62/494 X |
| 2,552,071 | 5/1951 | Terrill, Jr. | 62/494 X |
| 3,353,369 | 11/1967 | Whitlow | 62/476 X |
| 3,638,452 | 2/1972 | Kruggel | 62/485 |

*Primary Examiner*—Lloyd L. King

[57] ABSTRACT

An absorption apparatus for use in an absorption heat pump system comprising inner and outer helically wound tubular elements. An absorbing fluid flows in the outer element while a cooling fluid flows in the inner tubular element. A plurality of gas supply means supply gas to the outer tubular element from a gas distribution manifold.

7 Claims, 1 Drawing Figure

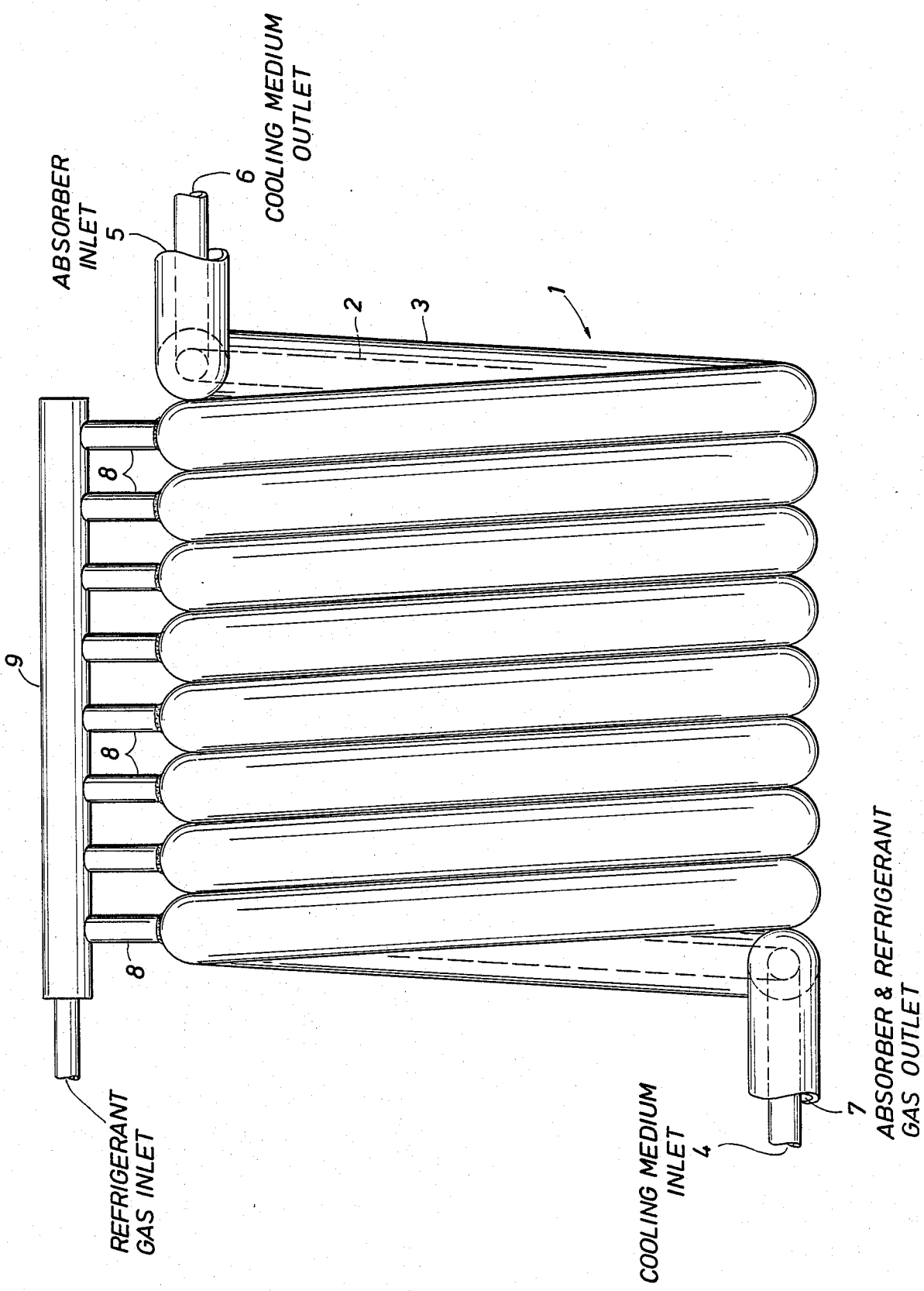

ABSORPTION APPARATUS FOR USE WITH ABSORPTION HEAT PUMPS

BACKGROUND OF THE INVENTION

The present invention relates to an apparatus for absorbing a gas in an absorbing liquid. In particular, the invention relates to such an apparatus for use in an absorption process involving large heat transfers.

An example of such an apparatus is the absorber in an absorption cycle heat pump. An absorption cycle heat pump is defined as a device which transfers heat generated by the heat dissipating components of the device to a space for heating purposes or, alternately transfers heat from the space to the heat absorbing components of the device. In an absorption cycle, heat pump refrigerant is absorbed into a liquid absorbent which is cooled externally in order to increase its absorption capacity. The concentrated solution of refrigerant in absorbent is pumped to a heated generator where refrigerant vapor is driven off at an increased pressure, and the separated absorbent is returned to the absorber. The refrigerant vapor passes to a condensor where it is condensed by heat exchange with a first fluid and then flows via an expansion valve through an evaporator, where the refrigerant liquid is evaporated by heat exchange with a second fluid. The heat made available to the first fluid may be used to heat an environment. Alternately, the cooling of the second fluid by heat dissipation in the evaporator may be used for cooling a space. Heat pumps of the absorption cycle type are normally operated with water as the absorbent and ammonia as the refrigerant.

An essential part of the absorption cycle heat pumps is the absorber itself. The absorber refrigerant is caused to dissolve in a liquid absorbent solution to form a solution rich in refrigerant and heat evolved during the absorption is removed by the cooling medium passing through the absorber. The heat exchange between absorbent and cooling medium should be as high as possible for the following main reasons: 1, the capacity of a heat pump system depends upon the quantity of refrigerant which is passed through the system, the capacity may be increased by increasing the quantity of refrigerant; and 2, the efficiency of the absorber is determined by the ratio between quantity of refrigerant being circulated and the quantity of absorbent required, increase of this ratio forms an improvement of the absorber efficiency. Furthermore, if heat pumps are intended for use in locations where free space is restricted, it is a major requirement that the heat pump units, and therefore the absorber be of a compact construction.

The known absorbers in absorption cycle heat pumps fail to combine the above features of high efficiency, high capacity and compactness. Compactness of the absorbers is normally accompanied with a relatively low heat pump efficiency, while high efficiency asks for high and complicated absorber constructions.

SUMMARY OF THE INVENTION

The object of the present invention is to provide an absorber for use in heat pump systems which have a high efficiency in combination with a compact construction.

The absorber of the present invention comprises a helically wound inner tubular element arranged within a helically wound outer tubular element thereby leaving a space for the passage of absorbent. A cooling fluid inlet and a cooling fluid outlet are arranged at opposite ends of the inner tubular element. An absorbent inlet and an absorbent outlet are also arranged at opposite ends of the outer tubular element, the inlets being arranged to provide countercurrent flow of cooling fluid and absorbent. The outer tubular element is provided with a plurality of gas supply means distributed over substantially the length of the outer element and in fluid communication with a gas distributing conduit.

During operation of the proposed absorber a liquid absorbent is passed through the outer tubular element while refrigerant is introduced into the liquid absorbent stream at a plurality of locations along the liquid absorbent path via the gas supply means. The introduced refrigerant streams cause turbulence in the absorbent stream which turbulence results in an intimate mixing between the absorbent and the refrigerant over the length of the absorber and promotes a high absorption rate. The turbulence of the liquid absorbent furthermore promotes the transfer of absorption heat to the cooling medium passing through the inner tubular element. This heat transfer serves two objectives; 1, enlargement of the absorption capacity of the absorber and 2, increase of the heating of the cooling medium. Objective 1 results in a high efficiency of the absorber and therefore the pump unit and objective 2 enables the heat absorbed by the cooling medium to be sufficient to be effectively used in other parts of the heat pump or in an outside space.

BRIEF DESCRIPTION OF THE DRAWINGS

The present invention will be more easily understood from the following description when taken in conjunction with the accompanying drawing showing a longitudinal section of an absorber constructed according to the invention.

DESCRIPTION OF PREFERRED EMBODIMENT

The shown absorber, indicated with reference numeral 1, comprises an inner helically wound tubular element 2 and substantially coaxially therewith an outer helically wound tubular element 3. As shown in the drawing, the windings of the outer tubular element 3 are contiguous to one another. The inner and the outer tubular elements are provided with inlets 4 and 5 respectively, for supply of cooling medium and liquid absorbent into the inner tubular element and into the space between the inner and outer tubular elements, respectively. The inlets 4 and 5 are arranged at opposite ends of absorber 1, so as to allow for a countercurrent flow of liquid-absorbent and cooling medium during operation of the apparatus. For discharge of cooling medium and liquid absorbent the tubular elements are provided with outlets 6 and 7 respectively.

The full advantage of the space saving effect of the helical shape of the tubular elements can be achieved when the windings of the outer helix match one another. The diameter of the tubular elements depends on the required absorbent throughput and the required rate of cooling in the absorber. The rate of curvature of the tubular elements in axial direction depends on the manufacturing facilities. If this curvature is only moderate, it may be advantageous to arrange flow obstacles between the tubular elements to promote turbulence of the absorbent flow. Such obstacles may have any suitable shape and they may be connected to the wall of one or each of the tubular elements.

The outer tubular element may be provided with further means for cooling the absorbent. These means may be suitably formed of a further helically wound tubular element arranged around the outer tubular element and having its longitudinal axis substantially coinciding with the longitudinal axis of the outer tubular element.

For supplying gas to the space between the inner and the outer tubular elements, a plurality of gas conduits 8 are connected to the outer tubular element. The gas conduits 8 are substantially uniformly distributed over the length of the absorber and extend substantially radially outwardly with respect to the outer tubular element 3. The gas conduits 8 are further connected to a gas distributing conduit 9 extending along the tubular elements 2 and 3. The gas conduits 8 should be sufficiently small in cross-section for two different reasons, 1, to allow a substantially uniform distribution of gas from the distributing conduit 9 over the gas conduits 8, and 2, to allow turbulence of fluid in the outer tubular element 3 to promote intimate contact between gas and liquid absorbent.

During operation of the shown absorber for absorbing, for example, ammonia in water, water is passed through the outer tubular element 3 while cooling medium, for example cooling water, is caused to flow in opposite direction through the inner tubular element 2. Ammonia vapor is introduced into the water passing through the outer tubular element 3 via the distributing conduit 9 and the gas conduits 8. Heat released during the absorption is removed from the system via the cooling water. The water with absorbed ammonia leaves the apparatus via the outlet 7. Gas components not absorbed by the water may be removed by introducing the discharged water into, for example, a gravity settler.

The gas supply means are preferably substantially uniformly distributed over the length of the outer tubular element, to optimize the favorable effects of turbulence as mentioned in the above. Any suitable construction may be chosen for the gas supply means. Preferred for the sake of simplicity these means are, however, in the shape of gas supply conduits forming a fluid communication between the space enclosed by the outer tubular element and one or more substantially straight gas distributing conduits running along the tubular elements. The number of gas supply conduits is preferably as large as possible, in order to promote a turbulent flow pattern over the full flow length in the absorber. The gas supply conduits should be relatively narrow to allow for an even distribution of gas from the gas distributing means into these conduits as well as for promoting the generation of turbulence in the absorbent passing through the outer tubular element.

To promote intensive mixing of gas from the gas supply conduits with the absorbent, the gas supply conduits are preferably substantially radially arranged with respect to the outer tubular element, so that the momentum flow of the gas is most effectively used for generating turbulence. The outlet ends of the gas supply conduits may be arranged flush with the wall of the outer tubular element. If a relatively viscous absorbent is used, it may, however, be preferred to have the outlet ends of the gas conduits extended in the annular space between the inner and the outer tubular element. In this manner breaking-up of the absorbent stream and mixing of gas with the absorbent are intensified.

It should be noted that, without departing from the invention, the absorber may be provided with a plurality of inner tubular elements arranged with the outer tubular element. A single inner tubular element substantially coaxial with the outer tubular element is, however, preferred from a point of view of simplicity.

To allow for a simple manufacturing procedure and easy inspection of the absorber, once in operative condition, the gas supply conduits preferably extend at the outer side of the space enclosed by the helically wound tubular elements.

If, however, the available space is rather restricted, the gas conduits and the gas distributing means may also be arranged in the inner space laterally enclosed by the helices of the outer tubular element. In a further embodiment according to the invention the gas conduits may be partly arranged in said inner space and partly at the outer side of the outer tubular element.

Since the tubular elements have the shape of helices, the absorbent and gas passing through the space between the inner and the outer tubular elements, are continuously remixed with one another so that the gas can be easily dissolved in the absorbent stream. The most important effect of the turbulence and the mixing between the two phases, is however, the fact that the heat evolved during the absorption can be easily withdrawn via the cooling medium passing through the inner tubular element. To simplify manufacturing of the proposed absorber, the tubular elements have a substantially circular cross-section. The walls of the tubular elements may be smooth or provided with protrusions, such as corrugations. If corrugated walls are used, the corrugations may contribute to the mixing of gas with absorbent especially if they extend substantially perpendicularly with the main flow direction of the absorbent.

What is claimed is:

1. An absorber for use in an absorption heat pump system, comprising:
   a helically wound inner tube, said inner tube having an inlet and an outlet;
   a helically wound outer tube, said outer tube having an inlet and outlet and arranged to surround said helically wound inner tube to provide an annular space between said inner and outer tubes, the inlets and outlets of said inner and outer tubes being arranged to provide counterflow between an absorbent fluid flowing in said outer tubular element and a cooling fluid flowing in said inner tubular element; and
   gas supply means, said gas supply means communicating with said outer tubular element to supply gas to said absorbent fluid.

2. The absorption apparatus of claim 1 wherein said gas supply means comprises a plurality of gas supply conduits substantially uniformly distributed along said outer tubular element.

3. The absorption apparatus of claim 2 wherein said gas supply conduits extend substantially radially with respect to said outer tubular element.

4. The absorption apparatus of claim 3 and in addition, a gas distribution manifold, said gas supply conduits extending from said gas distribution manifold.

5. The absorption apparatus of claim 3 wherein the outlets of said gas supply conduits are substantially flush with the wall of said outer tubular element.

6. The absorption apparatus of claim 1 wherein the windings of said outer tubular element substantially match and contact one another.

7. The absorption apparatus of claim 4 wherein the outlets of said gas supply conduits are substantially flush with the wall of said outer tubular element.

* * * * *